UNITED STATES PATENT OFFICE.

THOMAS A. EDISON, OF LLEWELLYN PARK, WEST ORANGE, NEW JERSEY, ASSIGNOR TO EDISON STORAGE BATTERY COMPANY, OF WEST ORANGE, NEW JERSEY, A CORPORATION OF NEW JERSEY.

STORAGE BATTERY.

1,036,471.  Specification of Letters Patent.  Patented Aug. 20, 1912.

No Drawing.  Application filed June 6, 1910.  Serial No. 565,157.

*To all whom it may concern:*

Be it known that I, THOMAS A. EDISON, a citizen of the United States, and a resident of Llewellyn Park, West Orange, in the county of Essex and State of New Jersey, have invented certain new and useful Improvements in Storage Batteries, of which the following is a description.

In United States Letters Patent No. 873,220, granted December 10, 1907, I describe certain improvements in storage batteries using an alkaline electrolyte with an oxygen compound of nickel as the active depolarizing material and in which an oxygen compound of bismuth is added to the nickel mass so as to result in a substantial increase in the capacity. The process described in the said patent for adding the bismuth compound to the nickel mass consists in precipitating together the nickel and bismuth compounds from their dissolved salts. In my United States Letters Patent No. 946,540, granted January 18, 1910, I describe a different process of mixing the bismuth and nickel compounds, consisting in soaking the active nickel hydroxid mass in a solution of a bismuth salt such as tri-chlorid of bismuth dissolved in a strong aqueous solution of chlorid of ammonia, or dissolved to saturation in acetone and the result decomposed by an alkali and washed free of the alkali salts. The nickel hydroxid then contains about 20% of bismuth oxid or hydroxid, which resultant material is dried and loaded into perforated containing pockets to form the positive electrodes of the battery.

I have now found that in place of the two processes described, I can proceed simply as follows: I crush nickel hydroxid to a fine powder and add to this 20% or less of bismuth oxid also crushed to a fine powder. The product is thoroughly mixed and loaded under pressure into non-deformable inclosing pockets in charges alternated with charges of flakes of metallic nickel as described and claimed in my application Serial No. 567,371, filed July 17, 1910, to form the positive elements of my battery. I have also found that instead of bismuth oxid, I can use the powdered metallic bismuth in mixture with the powdered nickel hydroxid, in which case only 15 or 16 per cent. of the bismuth is necessary. This result was somewhat unexpected and makes a process which is simpler and cheaper than those previously described.

The action of bismuth in the cell is to increase the capacity and stability of the positive element, but the reason for this action is not well known. It is probably due to the making of better electrical contacts between the nickel hydroxid and the metallic flake contained in the tube and the metallic tube itself, as under the action of the electrical current the bismuth oxidizes to an oxid which is a conductor of electricity, and when the cell is discharged the bismuth remains a conductor, the bismuth oxid then being reduced to metallic bismuth, which also is a conductor of electricity. Under all conditions of working, therefore, the bismuth or its electrically formed oxid is a conductor of electricity, which is a quite unique result. The bismuth performs its desired function as well in this process of mechanical mixture as in the previously patented processes, the bismuth going somewhat into solution upon the charging of the cell and plating out upon the nickel flake and hydroxid during the discharge of the cell.

Having now described my invention, what I claim and desire to protect by Letters Patent is as follows:—

1. The process of forming a depolarizing electrode for a storage battery, consisting in crushing nickel hydroxid to a powder, crushing material containing bismuth to a powder, mechanically mixing the same in such proportion that there is much more of the nickel hydroxid than of the bismuth in the mixture, and loading under pressure a perforated non-deformable inclosing pocket with the same, substantially as described.

2. The process of forming a depolarizing electrode for a storage battery, consisting in crushing nickel hydroxid to a powder, crushing material containing bismuth to a powder, mechanically mixing the same in such proportion that there is much more of the nickel hydroxid than of the bismuth in the mixture, and forming an electrode thereof, substantially as described.

3. An active material for storage battery electrodes, consisting of powdered nickel hydroxid mechanically and intimately mixed with twenty per cent. or less of powdered material containing bismuth, substantially as described.

This specification signed and witnessed this 31st day of May 1910.

THOS. A. EDISON.

Witnesses:
DYER SMITH,
JOHN M. CANFIELD.

---

Correction in Letters Patent No. 1,036,471.

It is hereby certified that in Letters Patent No. 1,036,471, granted August 20, 1912, upon the application of Thomas A. Edison, of Llewellyn Park, West Orange, New Jersey, for an improvement in "Storage Batteries," an error appears in the printed specification requiring correction as follows: Page 1, line 72, for the word "electrically" read *electrolytically;* and that the said Letters Patent should be read with this correction therein that the same may conform to the record of the case in the Patent Office.

Signed and sealed this 17th day of September, A. D., 1912.

[SEAL.]

C. C. BILLINGS,

*Acting Commissioner of Patents.*